(12) United States Patent
Yaghooti

(10) Patent No.: US 11,506,552 B2
(45) Date of Patent: Nov. 22, 2022

(54) DEVICE FOR SENSING PRESSURE

(71) Applicant: Hamed Yaghooti, Hamedan (IR)

(72) Inventor: Hamed Yaghooti, Hamedan (IR)

( * ) Notice: Subject to any disclaimer, the term of this patent is extended or adjusted under 35 U.S.C. 154(b) by 0 days.

(21) Appl. No.: 17/387,234

(22) Filed: Jul. 28, 2021

(65) Prior Publication Data

US 2021/0356341 A1 Nov. 18, 2021

Related U.S. Application Data

(60) Provisional application No. 63/057,317, filed on Jul. 28, 2020.

(51) Int. Cl.
*G01L 9/00* (2006.01)
*G01L 19/06* (2006.01)

(52) U.S. Cl.
CPC ........ *G01L 9/0041* (2013.01); *G01L 19/0618* (2013.01)

(58) Field of Classification Search
None
See application file for complete search history.

(56) References Cited

U.S. PATENT DOCUMENTS

| 3,875,798 | A | * | 4/1975 | Varga | G01F 23/164 |
| | | | | | 73/302 |
| 4,409,833 | A | * | 10/1983 | Thomson | G01F 23/167 |
| | | | | | 73/302 |
| 9,459,172 | B2 | * | 10/2016 | Chen | G01L 9/0055 |
| 2008/0060440 | A1 | * | 3/2008 | Toyoda | G01L 9/0054 |
| | | | | | 73/756 |
| 2013/0150225 | A1 | * | 6/2013 | Katz | A61M 1/3693 |
| | | | | | 73/705 |

* cited by examiner

*Primary Examiner* — Lisa M Caputo
*Assistant Examiner* — Nigel H Plumb
(74) *Attorney, Agent, or Firm* — Bajwa IP Law Firm; Haris Zaheer Bajwa

(57) ABSTRACT

A pressure sensing device for sensing pressure. The pressure sensing device includes a sealed chamber, a second flexible diaphragm, and a protector member. The sealed chamber includes an upper portion comprising a first flexible diaphragm and a lower portion. The protector member includes a bottom surface with a fist concave shape, a top surface with a second concave shape, and a longitudinal hole between a lower cavity and an upper cavity. The lower cavity is between the first flexible diaphragm and a bottom surface of the protector member. The upper cavity is between the second flexible diaphragm and an upper surface of the protector member.

9 Claims, 13 Drawing Sheets

100

100

122

128

500

DEVICE FOR SENSING PRESSURE

CROSS-REFERENCE TO RELATED APPLICATION

This application claims the benefit of priority from pending U.S. Provisional Patent Application Ser. No. 63/057,317, filed on Jul. 28, 2020, and entitled "ACCURATE MEASURMENT MECHANISM OF HIGH AND LOW PRESSURES" which is incorporated herein by reference in its entirety.

TECHNICAL FIELD

The present disclosure generally relates to pressure sensor and measurement technology. This disclosure, more particularly, relates to low cost pressure sensors for applications of pressure sensors and pressure gauges for gases and liquids.

BACKGROUND

Modern industrial, commercial, aerospace, and military systems depend critically on reliable pressure sensors for fluid handling. Both gas and liquid fluids provide the advantage of smaller, more distributed, and more portable systems for increasing uses in instrumentation and control. Although important advances in pressure sensor have been made in the past few decades, progress has been considerably slow in reducing costs of such sensors. Presently such devices are manufactured and require a re-working step, where the pressure sensor is trimmed to tune it to a proper range (high pressures or low pressures) for each pressure sensor. This re-working step may significantly increase the total cost of a pressure sensor. In different industries, many pressure sensors may be used to measure different ranges of pressures. There is, therefore, a need for an inexpensive single pressure sensor that is able to measure both high pressures and low pressures and increase the accuracy of the measurement.

SUMMARY

This summary is intended to provide an overview of the subject matter of the present disclosure, and is not intended to identify essential elements or key elements of the subject matter, nor is it intended to be used to determine the scope of the claimed implementations. The proper scope of the present disclosure may be ascertained from the claims set forth below in view of the detailed description below and the drawings.

In one general aspect, the present disclosure describes an exemplary pressure sensing device. An exemplary pressure sensing device may include a sealed chamber. In an exemplary embodiment, the sealed chamber may include an upper portion and a lower portion.

In an exemplary embodiment, the upper portion may include a first flexible diaphragm. In an exemplary embodiment, a top surface of the first flexible diaphragm may be configured to be displaced upwardly responsive to application of a first hydrostatic pressure to a bottom surface of the first flexible diaphragm. In an exemplary embodiment, an amount of the top surface of the first flexible diaphragm's displacement may be proportional to a magnitude of the first hydrostatic pressure.

In an exemplary embodiment, the lower portion may include an input port. In an exemplary embodiment, the lower portion may be configured to receive a fluid at the input port and conduct the fluid toward the first flexible diaphragm.

In an exemplary embodiment, the pressure sensing device may further include a second flexible diaphragm. In an exemplary embodiment, a center of the second flexible diaphragm may be configured to be displaced upwardly responsive to application of a second hydrostatic pressure to a bottom surface of the second flexible diaphragm. In an exemplary embodiment, the center of the second flexible diaphragm's displacement may be proportional to the second hydrostatic pressure.

In an exemplary embodiment, the pressure sensing device may further include a protector member disposed onto the top surface of the first flexible diaphragm. In an exemplary embodiment, the second flexible diaphragm may be disposed onto the protector member. In an exemplary embodiment, the protector member may include a bottom surface, a top surface, and a longitudinal hole.

In an exemplary embodiment, the bottom surface of the protector member may include a first concave shape. In an exemplary embodiment, the bottom surface of the protector member and the top surface of the first flexible diaphragm may define a lower cavity between the protector member and the top surface of the first flexible diaphragm.

In an exemplary embodiment, the top surface may include a second concave shape. In an exemplary embodiment, the top surface of the protector member and a bottom surface of the second flexible diaphragm may define an upper cavity between the protector member and the second flexible diaphragm.

In an exemplary embodiment, the longitudinal hole may be positioned between the lower cavity and the upper cavity. In an exemplary embodiment, an upper end of the longitudinal hole may be connected to the upper cavity. In an exemplary embodiment, a lower end of the longitudinal hole may be connected to the lower cavity. In an exemplary embodiment, the lower cavity and the upper cavity may be in fluid communication with each other through the longitudinal hole. In an exemplary embodiment, the lower cavity, the upper cavity, and the longitudinal hole may be filled with a hydraulic oil.

In an exemplary embodiment, when the fluid enters into the sealed chamber, the fluid may apply the first hydrostatic pressure to the bottom surface of the second flexible diaphragm. Furthermore, the top surface of the first flexible diaphragm may be displaced upwardly, a first amount of the hydraulic oil may be displaced from the lower cavity into the upper cavity through the longitudinal hole, and the center of the second flexible diaphragm may be displaced upwardly due to application of the second hydrostatic pressure to the bottom surface of the second flexible diaphragm.

In an exemplary embodiment, the pressure sensing device may further include a displacement measurement system. In an exemplary embodiment, the displacement measurement system may be configured to measure the center of the second flexible diaphragm's displacement.

In an exemplary embodiment, the first flexible diaphragm may have a first disc shape. In an exemplary embodiment, a thickness of the first flexible diaphragm may be variable along a surface of the flexible diaphragm. In an exemplary embodiment, a center of the first flexible diaphragm may include a first thickness. In an exemplary embodiment, the thickness of the first flexible diaphragm may increase along a radial direction from the center of the first flexible diaphragm toward a periphery of the first flexible diaphragm.

In an exemplary embodiment, a center thickness of the center of the first flexible diaphragm may be 0.2 millimeter. In an exemplary embodiment, a periphery thickness of the periphery of the first flexible diaphragm may be 2 millimeters. In an exemplary embodiment, a diameter of the first flexible diaphragm is 50 millimeters.

In an exemplary embodiment, the second flexible diaphragm may have a second disc shape. In an exemplary embodiment, a second flexible diaphragm thickness of the second flexible diaphragm may be 0.05 millimeter. In an exemplary embodiment, the hydraulic oil may be a silicon oil.

In an exemplary embodiment, the protector member may further include a transverse hole in fluid communication with the longitudinal hole. In an exemplary embodiment, the protector member may further include a pin configured to be disposed inside the transverse hole. In an exemplary embodiment, a diameter of the pin may correspond to an inner diameter of the transverse hole. In an exemplary embodiment, the pin may be configured to block the transverse hole and prevent the hydraulic oil leakage from the transverse hole when the pin is disposed inside the transverse hole. In an exemplary embodiment, the pin may further be configured to unblock the transverse hole and allow the hydraulic oil to be discharged from the transverse hole when the pin is removed from the transverse hole.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

Figure 1A:
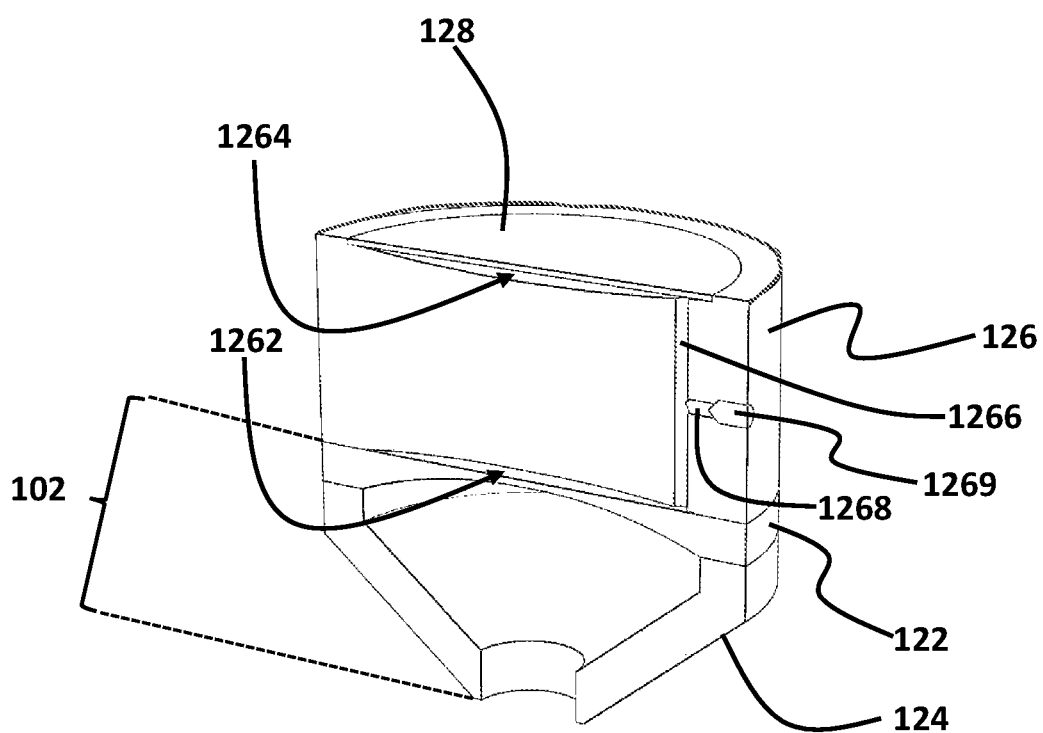
FIG. 1A illustrates a perspective sectional view of a pressure sensing device, consistent with one or more exemplary embodiments of the present disclosure.

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

The following detailed description is presented to enable a person skilled in the art to make and use the methods and devices disclosed in exemplary embodiments of the present disclosure. For purposes of explanation, specific nomenclature is set forth to provide a thorough understanding of the present disclosure. However, it will be apparent to one skilled in the art that these specific details are not required to practice the disclosed exemplary embodiments. Descriptions of specific exemplary embodiments are provided only as representative examples. Various modifications to the exemplary implementations will be readily apparent to one skilled in the art, and the general principles defined herein may be applied to other implementations and applications without departing from the scope of the present disclosure. The present disclosure is not intended to be limited to the implementations shown, but is to be accorded the widest possible scope consistent with the principles and features disclosed herein.

The present disclosure is directed to exemplary embodiments of a pressure sensing device for sensing both high and low pressures. An exemplary pressure sensing device may include a sealed chamber with a first flexible diaphragm as an upper portion. The sealed chamber may be of any size or shape. The first flexible diaphragm may have variable thicknesses along the first flexible diaphragm's surface. For example, a center of the first flexible diaphragm may be relatively thin and a periphery of the first flexible diaphragm may comparatively be thicker than the center of the first flexible diaphragm. A thickness of the first flexible diaphragm may be variable along its surface. A protector member may be disposed onto a top surface of the first flexible diaphragm and a second flexible diaphragm may be disposed onto a top surface of the protector member. The protector may protect the first flexible diaphragm from failure under high pressure. A lower surface of the protector member may prevent the thin parts of the first flexible diaphragm from extra deflection.

A lower cavity may be formed between the top surface of the first flexible diaphragm and the bottom surface of the protector member. Also, an upper cavity may be formed between the top surface of the protector member and the bottom surface of the second flexible diaphragm. The protector member may include a longitudinal hole between the lower cavity and the upper cavity. The lower cavity, the upper cavity, and the longitudinal hole may be filled with a hydraulic oil such as silicon oil. When a fluid enters the sealed chamber, the hydrostatic pressure applied to a bottom surface of the first flexible diaphragm may cause the upper surface of the first flexible diaphragm to be displaced upwardly and, thereby, an amount of the hydraulic oil may be displaced from the lower cavity to the upper cavity. As a result of this displacement, a center of the second flexible diaphragm may be displaced upwardly. Then, this displacement may be measured by utilizing a displacement measurement system such as a dial indicator or a laser interferometer. As the displacement of the center of the second flexible diaphragm may be a predetermined function of the fluid pressure inside the sealed chamber, the fluid pressure may be determined by measuring the displacement of the center of the second flexible diaphragm.

Figure 1B:
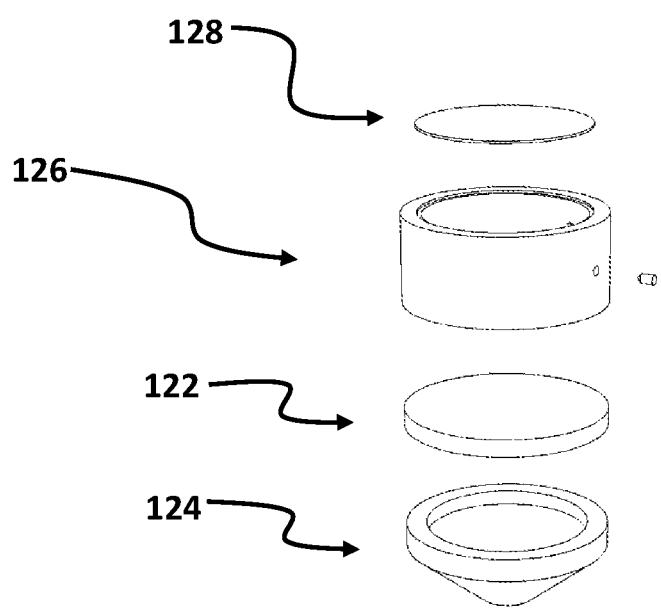
FIG. 1B illustrates an exploded view of a pressure sensing device, consistent with one or more exemplary embodiments of the present disclosure.
Figure 1C:
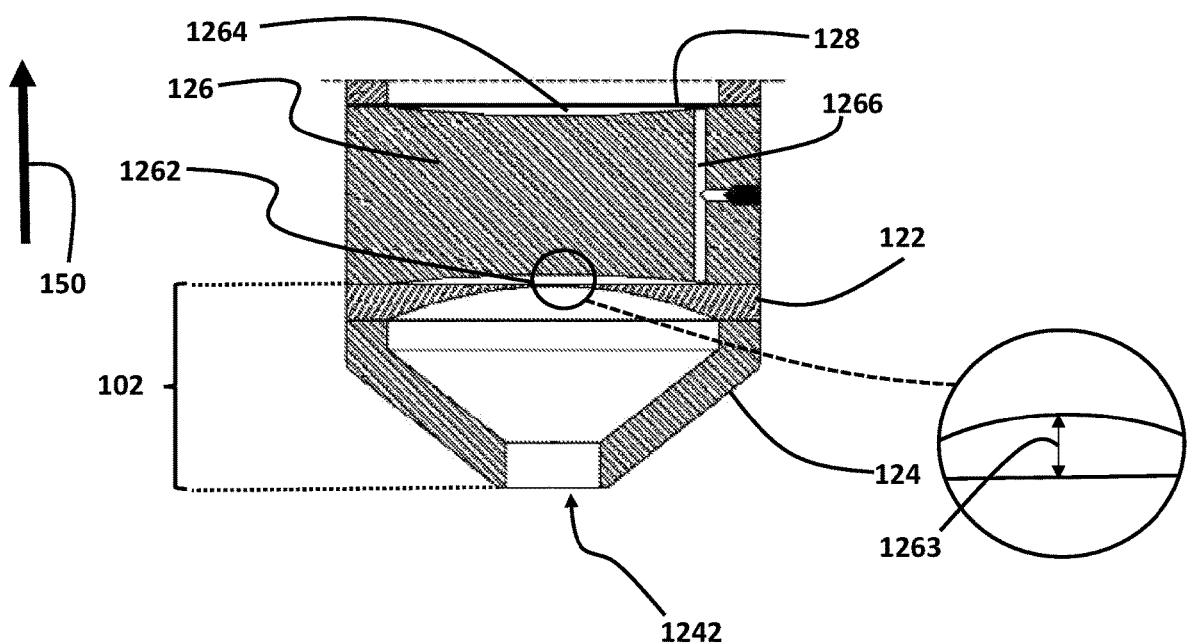
FIG. 1C illustrates a side sectional view of a pressure sensing device, consistent with one or more exemplary embodiments of the present disclosure.

FIG. 1A illustrates a perspective sectional view of a pressure sensing device 100, consistent with one or more exemplary embodiments of the present disclosure. FIG. 1B illustrates an exploded view of pressure sensing device 100, consistent with one or more exemplary embodiments of the present disclosure. FIG. 1C illustrates a side sectional view of pressure sensing device 100, consistent with one or more exemplary embodiments of the present disclosure. As shown in FIG. 1A and FIG. 1B, in an exemplary embodiment, pressure sensing device 100 may include a sealed chamber 102. In an exemplary embodiment, sealed chamber 102 may refer to a chamber that may be able to store a fluid in such a way that the stored fluid may not leak from the chamber. In an exemplary embodiment, sealed chamber 102 may include a first flexible diaphragm 122 as an upper portion of sealed chamber 102. In an exemplary embodiment, sealed chamber 102 may further include a lower portion 124.

Figure 2A:
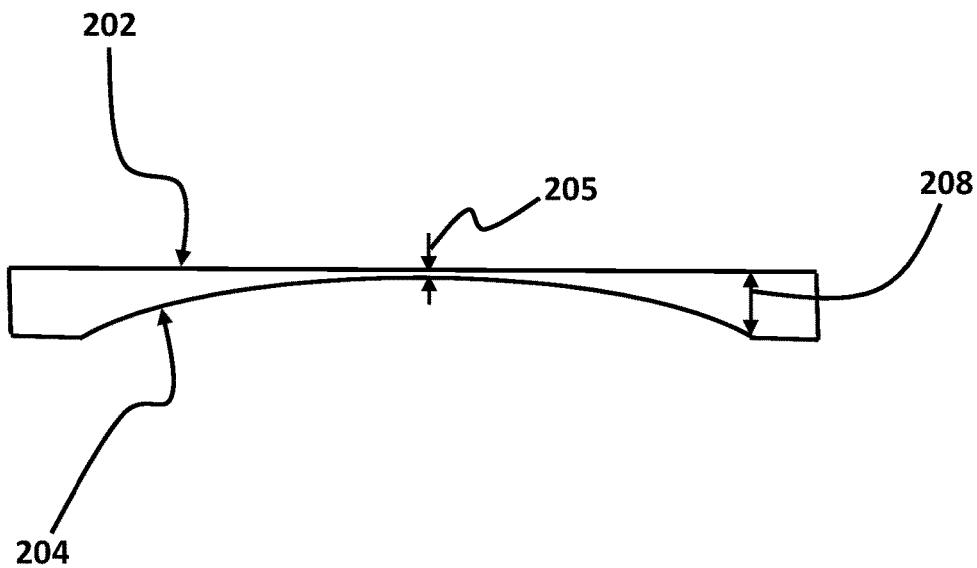
FIG. 2A illustrates a sectional side view of a first flexible diaphragm, consistent with one or more exemplary embodiments of the present disclosure.
Figure 2B:
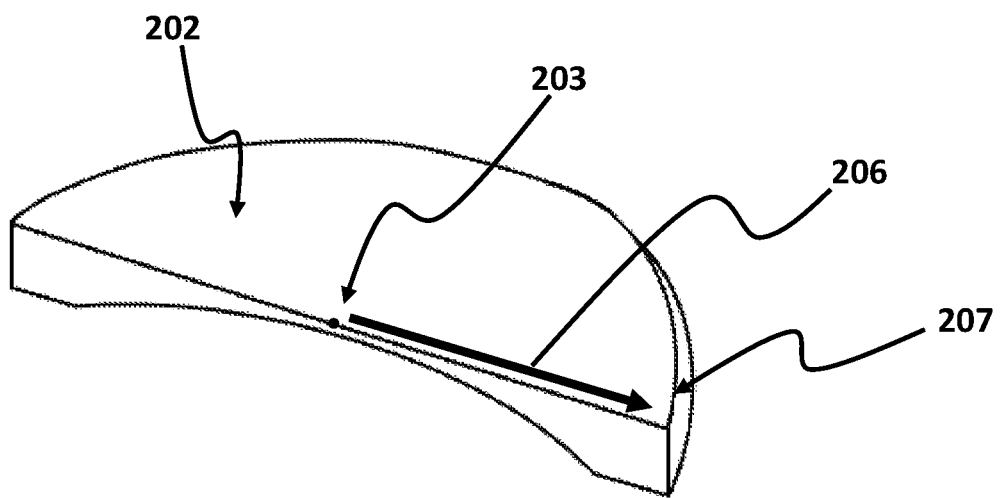
FIG. 2B illustrates a sectional perspective view of a first flexible diaphragm, consistent with one or more exemplary embodiments of the present disclosure.

FIG. 2A shows a sectional side view of first flexible diaphragm 122, consistent with one or more exemplary embodiments of the present disclosure. FIG. 2B shows a sectional perspective view of first flexible diaphragm 122, consistent with one or more exemplary embodiments of the present disclosure. As shown in FIG. 2A and FIG. 2B, in an exemplary embodiment, first flexible diaphragm 122 may include a top surface 202 and a bottom surface 204. In an exemplary embodiment, top surface 202 of first flexible diaphragm 122 may include a flat surface. In an exemplary embodiment, bottom surface 204 of first flexible diaphragm 122 may include a concave surface. In an exemplary embodiment, a thickness of first flexible diaphragm 122 may be variable along a surface of first flexible diaphragm 122. In an exemplary embodiment, first flexible diaphragm 122 may include a first thickness 205 at a center 203 of first flexible diaphragm 122. In an exemplary embodiment, a thickness of first flexible diaphragm 122 may increase along a radial direction 206 from center 203 of first flexible diaphragm 122 toward a periphery 207 of first flexible diaphragm 122. In an exemplary embodiment, first thickness 205 may be 0.2 millimeter. In an exemplary embodiment, a second thickness 208 at periphery 207 of first flexible diaphragm 122 may be 2 millimeters.

In an exemplary embodiment, when a hydrostatic pressure is applied to bottom surface 204 of first flexible diaphragm 122, top surface 202 of first flexible diaphragm 122 may be displaced upwardly in response too. In an exemplary embodiment, a measure of the displacement of top surface 202 of first flexible diaphragm 122 may be proportional to a magnitude of the hydrostatic pressure which may be applied to bottom surface 204 of first flexible diaphragm 122. In other words, greater hydrostatic pressure may cause more displacement in top surface 202 of first flexible diaphragm 122. In an exemplary embodiment, first flexible diaphragm 122 may deflect under an external pressure such as a hydrostatic pressure.

In an exemplary embodiment, lower portion 124 may include an input port 1242 at a bottom end of lower portion 124. In an exemplary embodiment, a fluid may enter sealed chamber 102 through input port 1242. In an exemplary embodiment, when a fluid enters sealed chamber 102, the fluid may apply a hydrostatic pressure to bottom surface 204 of first flexible diaphragm 122. As mentioned above, in an exemplary embodiment, the applied hydrostatic pressure to bottom surface 204 of first flexible diaphragm 122 may cause top surface 202 of first flexible diaphragm 122 to displace upwardly.

Figure 3:
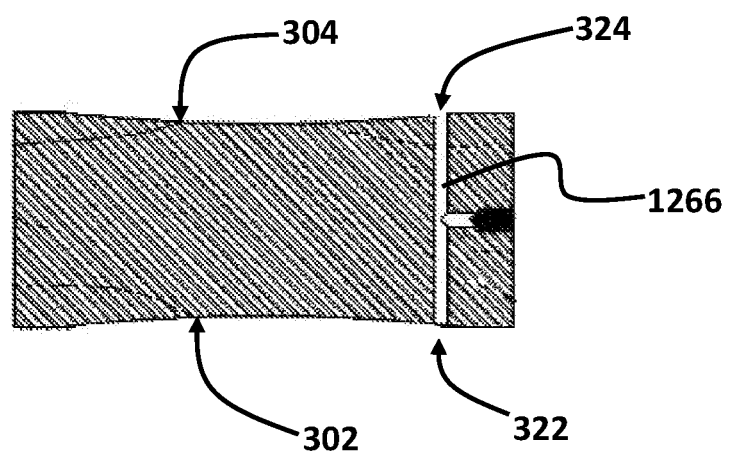
FIG. 3 illustrates a sectional side view of a protector member, consistent with one or more exemplary embodiments of the present disclosure.

In an exemplary embodiment, pressure sensing device 100 may further include a protector member 126. In an exemplary embodiment, protector member 126 may be disposed onto top surface 202 of first flexible diaphragm 122. FIG. 3 shows a sectional side view of protector member 126, consistent with one or more exemplary embodiments of the present disclosure. As shown in FIG. 3, in an exemplary embodiment, protector member 126 may include a bottom surface 302 and a top surface 304. In an exemplary embodiment, bottom surface 302 of protector member 126 may be a section of an internal surface of a sphere. In an exemplary embodiment, a maximum depth 1263 of lower cavity 1262 may be 0.15 millimeters. In an exemplary embodiment, bottom surface 302 of protector member 126 may have a first concave shape. In an exemplary embodiment, the first concave shape may allow first flexible diaphragm 122 to move upwardly along an upward direction 150. In an exemplary embodiment, upward direction 150 may refer to a direction from bottom surface 204 toward top surface 202. Also, the depth of bottom surface 302 may prevent extra deflection of thin sections of first flexible diaphragm 122 and, to thereby, may prevent the failure of first flexible diaphragm 122 under higher pressures. In an exemplary embodiment, top surface 304 of protector member 126 may have a second concave shape. In an exemplary embodiment, when protector member 126 is disposed onto top surface 202 of first flexible diaphragm 122, a lower cavity 1262 may be formed between bottom surface 302 of protector member 126 and top surface 202 of first flexible diaphragm 122.

Figure 4:
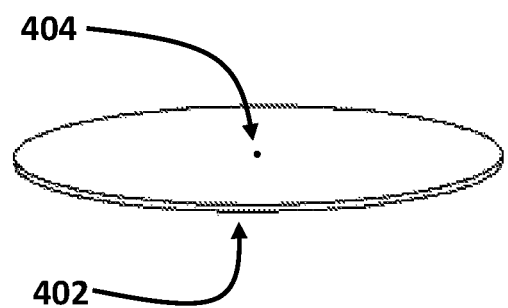
FIG. 4 illustrates a perspective view of a second flexible diaphragm, consistent with one or more exemplary embodiments of the present disclosure.

In an exemplary embodiment, pressure sensing device 100 may further include a second flexible diaphragm 128. FIG. 4 shows a perspective view of second flexible diaphragm 128, consistent with one or more exemplary embodiments of the present disclosure. In an exemplary embodiment, a thickness of second flexible diaphragm 128 may be 0.05 millimeter. In an exemplary embodiment, when a hydrostatic pressure is applied to a bottom surface 402 of second flexible diaphragm 128, a center 404 of second flexible diaphragm 128 may be displaced upwardly. In an exemplary embodiment, when second flexible diaphragm 128 may be disposed onto top surface 304 of protector member 126, an upper cavity 1264 may be formed between top surface 304 of protector member 126 and bottom surface 402 of second flexible diaphragm 128.

In an exemplary embodiment, protector member 126 may further include a longitudinal hole 1266 between lower cavity 1262 and upper cavity 1264. In an exemplary embodiment, a lower end 322 of longitudinal hole 1266 may be connected to lower cavity 1262. In an exemplary embodiment, an upper end 324 of longitudinal hole 1266 may be connected to upper cavity 1264. In an exemplary embodiment, lower cavity 1262 and upper cavity 1264 may be in fluid communication with each other through longitudinal hole 1266. In an exemplary embodiment, lower cavity 1262, upper cavity 1264, and longitudinal hole 1266 may be filled with a hydraulic oil. In an exemplary embodiment, the hydraulic oil may include silicon oil. In an exemplary embodiment, protector member 126 may further include a transverse hole 1268 in fluid communication with longitudinal hole 1266. In an exemplary embodiment, protector member 126 may further include a pin 1269. In an exemplary embodiment, pin 1269 may be disposed inside transverse hole 1268. In an exemplary embodiment, when pin 1269 is disposed inside transverse hole 1268, pin 1269 may block transverse hole 1268 and prevent the hydraulic oil leakage from transverse hole 1268. In an exemplary embodiment, when pin 1269 is removed from transverse hole 1268, transverse hole 1268 may be unblocked and, thereby, the hydraulic oil may be discharged from transverse hole 1268.

In an exemplary embodiment, when a first hydrostatic pressure is applied to bottom surface 204 of first flexible diaphragm 122, top surface 202 of first flexible diaphragm 122 may be displaced upwardly and occupy a space of lower cavity 1262. In an exemplary embodiment, when a space of lower cavity 1262 is occupied by displaced top surface 202 of first flexible diaphragm 122, a first amount of the hydraulic oil may be displaced from lower cavity 1262 to upper cavity 1264 through longitudinal hole 1266. In an exemplary embodiment, when the first amount of the hydraulic oil is pushed to upper cavity 1264, a second hydrostatic pressure may be applied to bottom surface 402 of second flexible diaphragm 128 and, thereby, center 404 of second flexible diaphragm 128 may be displaced upwardly. In an exemplary embodiment, a measure of the upward displacement of center 404 of second flexible diaphragm 128 may be proportional to the magnitude of the first hydrostatic pressure which may be applied to bottom surface 204 of first flexible diaphragm 122. Consequently, in an exemplary embodiment, a user may be able to determine the first hydrostatic pressure which is applied to bottom surface 204 of first flexible diaphragm 122 by measuring the displacement of center 404 of second flexible diaphragm 128.

In an exemplary embodiment, when a relatively low pressure is applied to bottom surface 204 of first flexible diaphragm 122, only thinner parts of first flexible diaphragm 122 (nearby center 203 of first flexible diaphragm 122) may be displaced and move toward bottom surface 302 of protector member 126. In an exemplary embodiment, a distance between center 203 of first flexible diaphragm 122 (when it is not displaced) and bottom surface 302 of protector member 126 may be such small that when thinner parts of first flexible diaphragm 122 (nearby center 203 of first flexible diaphragm 122) are displaced and move toward bottom surface 302 of protector member 126, thinner parts of first flexible diaphragm 122 (nearby center 203 of first flexible diaphragm 122) may be prevented to deflect further. In other words, thinner parts of first flexible diaphragm 122 (nearby center 203 of first flexible diaphragm 122) may reach bottom surface 302 of protector member 126 before losing its elastic properties due to the over deflection. In an exemplary embodiment, protector member 126 may protect first flexible diaphragm 122 against high pressures which may help pressure sensing device 100 to measure both high and low pressures. In an exemplary embodiment, when thinner parts of first flexible diaphragm 122 (nearby center 203 of first flexible diaphragm 122) reach bottom surface 302 of protector member 126, thinner parts of first flexible diaphragm 122 (nearby center 203 of first flexible diaphragm 122) may not be displaced further. In an exemplary embodiment, when higher pressures are applied to bottom surface 204 of first flexible diaphragm 122, thicker parts of first flexible diaphragm 122 (nearby periphery 207 of first flexible diaphragm 122) may be displaced and move toward bottom surface 302 of protector member 126. In an exemplary embodiment, both high and low pressures at bottom surface 204 of first flexible diaphragm 122 may cause a proper displacement of center 404 of second flexible diaphragm 128. In an exemplary embodiment, low pressures may displace thinner parts of first flexible diaphragm 122 (nearby center 203 of first flexible diaphragm 122) and, thus, low pressures may be measured through displacing thinner parts of first flexible diaphragm 122. In an exemplary embodiment, high pressures may displace thicker parts of first flexible diaphragm 122 (nearby periphery 207 of first flexible diaphragm 122) and, thus, high pressures may be measured through displacing thicker parts of first flexible diaphragm 122. As such, pressure sensing device 100 may be able to measure both low and high pressures in a single device.

In an exemplary embodiment, as discussed above, by utilizing pressure sensing device 100, both high and low pressures at bottom surface 204 of first flexible diaphragm 122 may be converted to a displacement at center 404 of second flexible diaphragm 128. Consequently, in an exemplary embodiment, by measuring the displacement of center 404 of second flexible diaphragm 128, a user may determine/calculate the pressure at bottom surface 204 of first flexible diaphragm 122.

Figure 5:
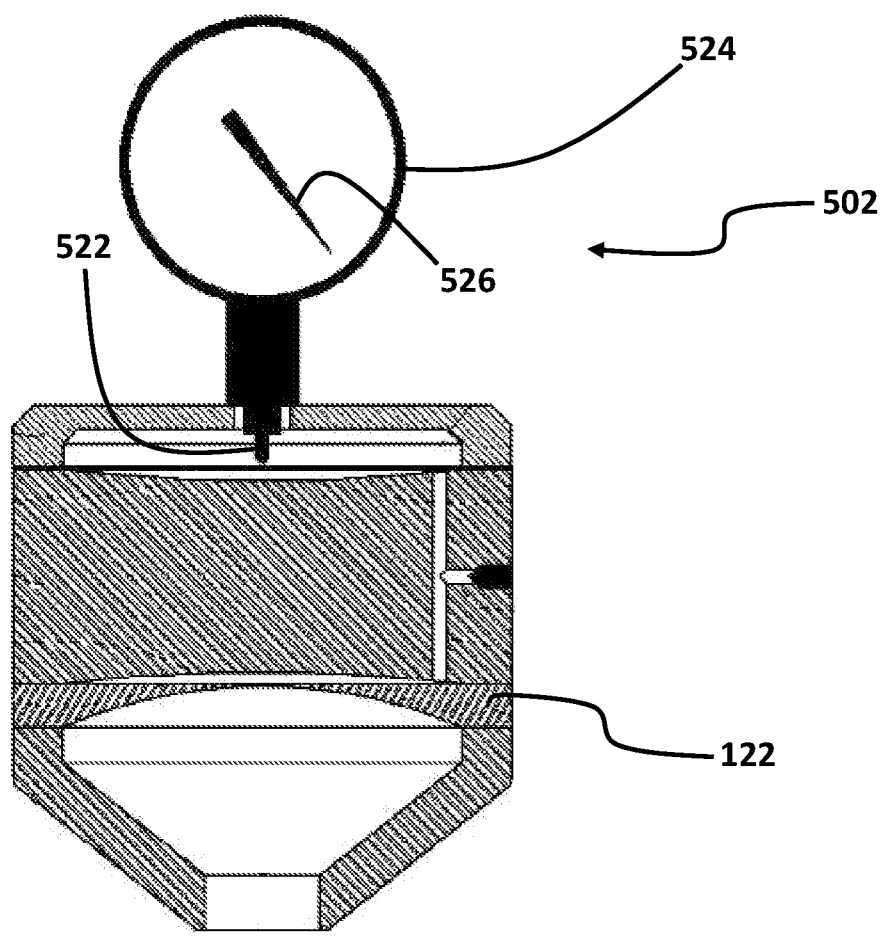
FIG. 5 illustrates a side view of a pressure sensing device, consistent with one or more exemplary embodiments of the present disclosure.

FIG. 5 shows a side view of a pressure sensing device 500, consistent with one or more exemplary embodiments of the present disclosure. As shown in FIG. 5, in an exemplary embodiment, pressure sensing device 500 may include all of the elements of pressure sensing device 100 and a displacement measurement system 502. In an exemplary embodiment, displacement measurement system 502 may be configured to measure the displacement of center 404 of second flexible diaphragm 128. In an exemplary embodiment, displacement measurement system 502 may include a dial indicator, a laser interferometer, or a combination thereof. In an exemplary embodiment, displacement measurement system 502 may include a probe 522 and a dial display 524 with a hand 526. In an exemplary embodiment, hand 526 may point to graduations in a circular scale on dial display 524 which represent the distance of probe 522 tip from a zero setting. In an exemplary embodiment, linear movement of probe 522 may be converted to a rotational movement of hand 526 through a rack and pinion mechanism.

Hence, as disclosed above, when a fluid enters sealed chamber 102, a first hydrostatic pressure (caused by the fluid pressure) may be applied to bottom surface 204 of first flexible diaphragm 122. As a result of applying the first hydrostatic pressure (caused by the fluid pressure) to bottom surface 204 of first flexible diaphragm 122, top surface 202 of first flexible diaphragm 122 may be displaced upwardly and, thereby, a first amount of the hydraulic oil may be displaced from lower cavity 1262 into upper cavity 1264. When the first amount of the hydraulic oil is displaced from lower cavity 1262 into upper cavity 1264, a second hydrostatic pressure may be applied to bottom surface 402 of second flexible diaphragm 128 and, thereby, center 404 of second flexible diaphragm 128 may be displaced. In an exemplary embodiment, displacement measurement system 502 may measure the displacement of center 404 of second flexible diaphragm 128. In an exemplary embodiment, as the displacement of center 404 of second flexible diaphragm 128 may be a predetermined function of the fluid pressure, the fluid pressure may be measured by measuring the displacement of center 404 of second flexible diaphragm 128.

Figure 6A:
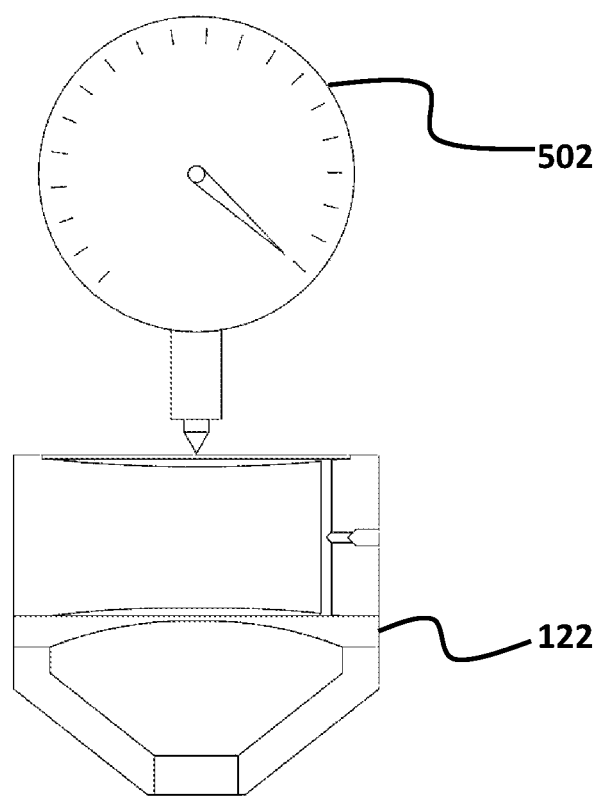
FIG. 6A illustrates a pressure sensing device in a scenario in which a sealed chamber is empty, consistent with one or more exemplary embodiments of the present disclosure.

FIG. 6A shows pressure sensing device 500 in a scenario in which sealed chamber 102 is empty, consistent with one or more exemplary embodiments of the present disclosure. As shown in FIG. 6A, when sealed chamber 102 is empty, top surface 202 of first flexible diaphragm 122 may not be displaced and, consequently, center 404 of second flexible diaphragm 128 may not be displaced as well.

Figure 6B:
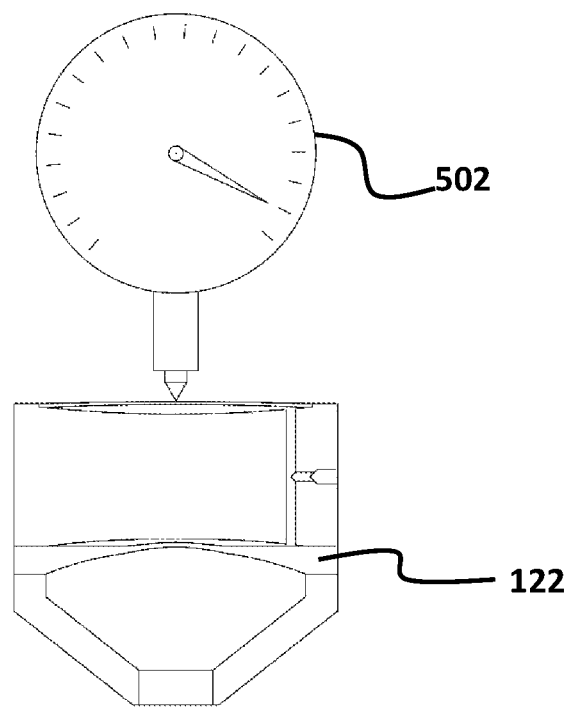
FIG. 6B illustrates a pressure sensing device in a scenario in which a sealed chamber is filled with a fluid with a first pressure, consistent with one or more exemplary embodiments of the present disclosure.

FIG. 6B shows pressure sensing device 500 in a scenario in which sealed chamber 102 is filled with a fluid with a first pressure, consistent with one or more exemplary embodiments of the present disclosure. As shown in FIG. 6B, when sealed chamber 102 is filled with a fluid with a first pressure (for example 50 mbar), top surface 202 of first flexible diaphragm 122 may be displaced by a first amount and, thereby, center 404 of second flexible diaphragm 128 may be displaced by a second amount which may be measured by displacement measurement system 502 as discussed above. In an exemplary embodiment, by obtaining the second amount, the first pressure may be determined. In an exemplary embodiment, the first pressure may be determined based on the second amount by using a lookup table which may relate different pressures to different displacements. In an exemplary embodiment, the lookup table may be made by conducting experiments at different pressures. For example, when a specific pressure is applied to bottom surface 302, center 404 of second flexible diaphragm 128 may be displaced by a respective amount. By conducting the same experiments with different pressures, the lookup table may be made. Then, a user may be able to determine the first pressure based on the second amount by utilizing the lookup table.

Figure 6C:
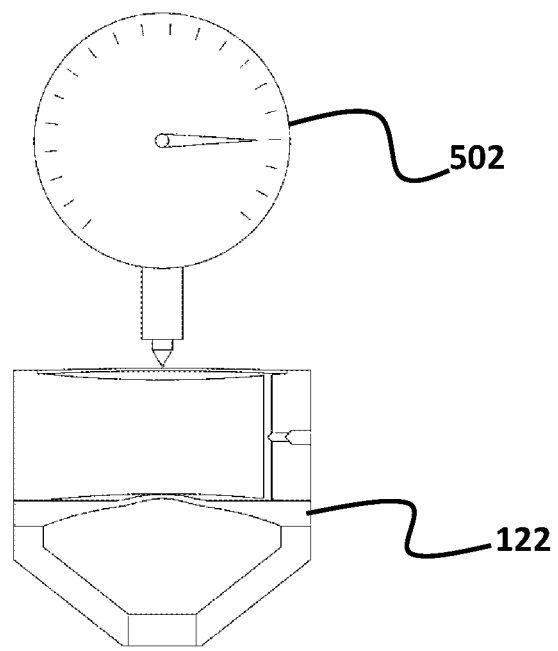
FIG. 6C illustrates a pressure sensing device in a scenario in which a sealed chamber is filled with a fluid with a second pressure, consistent with one or more exemplary embodiments of the present disclosure.

FIG. 6C shows pressure sensing device 500 in a scenario in which sealed chamber 102 is filled with a fluid with a second pressure, consistent with one or more exemplary embodiments of the present disclosure. As shown in FIG. 6C, when sealed chamber 102 is filled with a fluid with a second pressure (which is greater than the first pressure, for example 1 bar), top surface 202 of first flexible diaphragm 122 may be displaced by a third amount and, thereby, center 404 of second flexible diaphragm 128 may be displaced by a fourth amount which may be measured by displacement measurement system 502. In an exemplary embodiment, the fourth amount may be greater than the second amount. In an exemplary embodiment, by obtaining the fourth amount, the second pressure may be determined. In an exemplary embodiment, the second pressure may be determined based on the fourth amount by utilizing the lookup table.

Figure 6D:
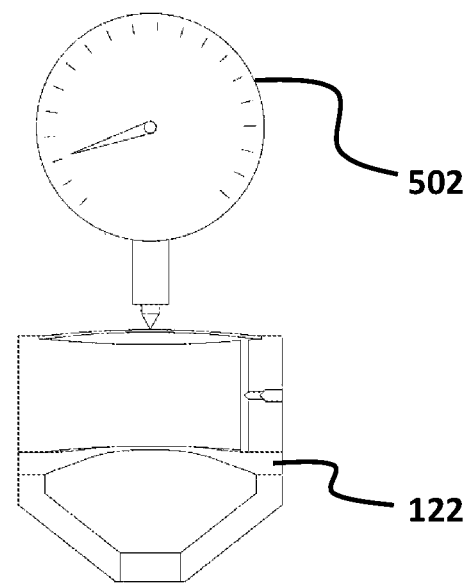
FIG. 6D illustrates a pressure sensing device in a scenario in which a sealed chamber is filled with a fluid with a third pressure, consistent with one or more exemplary embodiments of the present disclosure.

FIG. 6D shows pressure sensing device 500 in a scenario in which sealed chamber 102 is filled with a fluid with a third pressure, consistent with one or more exemplary embodiments of the present disclosure. As shown in FIG. 6D, when sealed chamber 102 is filled with a fluid with a third pressure (which is greater than the second pressure, for example 50 bar), top surface 202 of first flexible diaphragm 122 may be displaced by a fifth amount and, thereby, center 404 of second flexible diaphragm 128 may be displaced by a sixth amount which may be measured by displacement measurement system 502. In an exemplary embodiment, the sixth amount may be greater than the fourth amount. In an exemplary embodiment, by obtaining the sixth amount, the third pressure may be determined. In an exemplary embodiment, the third pressure may be determined based on the sixth amount by utilizing the lookup table.

Figure 6E:
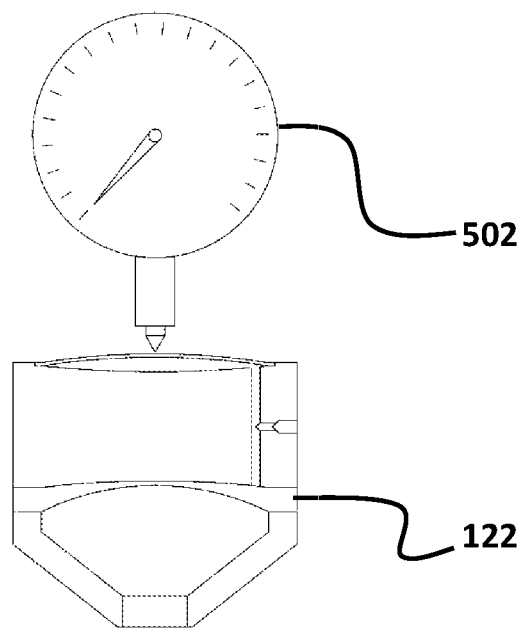
FIG. 6E illustrates a pressure sensing device in a scenario in which a sealed chamber is filled with a fluid with a fourth pressure, consistent with one or more exemplary embodiments of the present disclosure.

FIG. 6E shows pressure sensing device 500 in a scenario in which sealed chamber 102 is filled with a fluid with a fourth pressure, consistent with one or more exemplary embodiments of the present disclosure. As shown in FIG. 6E, when sealed chamber 102 is filled with a fluid with a fourth pressure (which is greater than the third pressure, for example 150 bar), top surface 202 of first flexible diaphragm 122 may be displaced by a seventh amount and, thereby, center 404 of second flexible diaphragm 128 may be displaced by an eighth amount which may be measured by displacement measurement system 502. In an exemplary embodiment, the eighth amount may be greater than the sixth amount. In an exemplary embodiment, by obtaining the eighth amount, the fourth pressure may be determined. In an exemplary embodiment, the fourth pressure may be determined based on the eighth amount by utilizing the lookup table. In an exemplary embodiment, by utilizing pressure sensing device 500 for measuring a fluid pressure, a wide range of pressures may be measured. For example, by utilizing pressure sensing device 500, fluid pressures between 50 mbar and 300 bar may be measured accurately.

While the foregoing has described what may be considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Ends 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective spaces of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various implementations. This is for purposes of streamlining the disclosure, and is not to be interpreted as reflecting an intention that the claimed implementations require more features than are expressly recited in each claim. Rather, as the following claims reflect, inventive subject matter lies in less than all features of a single disclosed implementation. Thus, the following claims are hereby incorporated into the Detailed Description, with each claim standing on its own as a separately claimed subject matter.

While various implementations have been described, the description is intended to be exemplary, rather than limiting and it will be apparent to those of ordinary skill in the art that many more implementations and implementations are possible that are within the scope of the implementations. Although many possible combinations of features are shown in the accompanying figures and discussed in this detailed description, many other combinations of the disclosed features are possible. Any feature of any implementation may be used in combination with or substituted for any other feature or element in any other implementation unless specifically restricted. Therefore, it will be understood that any of the features shown and/or discussed in the present disclosure may be implemented together in any suitable combination. Accordingly, the implementations are not to be restricted except in light of the attached claims and their equivalents. Also, various modifications and changes may be made within the scope of the attached claims.

What is claimed is:

1. A pressure sensing device, comprising:
   a sealed chamber, comprising:
      an upper portion comprising a first flexible diaphragm with a first disc shape, a top surface of the first flexible diaphragm configured to be displaced upwardly responsive to application of a first hydrostatic pressure to a bottom surface of the first flexible diaphragm, an amount of the top surface of the first flexible diaphragm's displacement proportional to a magnitude of the first hydrostatic pressure, a thickness of the first flexible diaphragm variable along a surface of the flexible diaphragm, a center of the first flexible diaphragm comprising a first thickness, the thickness of the first flexible diaphragm increasing along a radial direction from the center of the first flexible diaphragm toward a periphery of the first flexible diaphragm, a center thickness of the center of the first flexible diaphragm being 0.2 millimeter, a periphery thickness of the periphery of the first flexible diaphragm being 2 millimeters, a diameter of the first flexible diaphragm being 50 millimeters; and
      a lower portion, the lower portion comprising an input port, the lower portion configured to receive a fluid at the input port and conduct the fluid toward the first flexible diaphragm;
   a second flexible diaphragm with a second disc shape, a second flexible diaphragm thickness of the second flexible diaphragm being 0.05 millimeter, a center of the second flexible diaphragm configured to be displaced upwardly responsive to application of a second hydrostatic pressure to a bottom surface of the second flexible diaphragm, the center of the second flexible diaphragm's displacement proportional to the second hydrostatic pressure; and
   a protector member disposed onto the top surface of the first flexible diaphragm, the second flexible diaphragm disposed onto the protector member, the protector member comprising:
      a bottom surface with a fist concave shape, the bottom surface of the protector member and the top surface of the first flexible diaphragm defining a lower cavity between the protector member and the top surface of the first flexible diaphragm, a maximum depth of the lower cavity being 0.15 millimeters;
      a top surface with a second concave shape, the top surface of the protector member and a bottom surface of the second flexible diaphragm defining an upper cavity between the protector member and the second flexible diaphragm;
      a longitudinal hole between the lower cavity and the upper cavity, an upper end of the longitudinal hole connected to the upper cavity, a lower end of the longitudinal hole connected to the lower cavity, the lower cavity and the upper cavity in fluid communication with each other through the longitudinal hole, the lower cavity, the upper cavity, and the longitudinal hole filled with a hydraulic oil, the hydraulic oil comprising a silicon oil;
      a transverse hole in fluid communication with the longitudinal hole; and
      a pin configured to be disposed inside the transverse hole, a diameter of the pin corresponds to an inner diameter of the transverse hole, the pin configured to:
         block the transverse hole and prevent the hydraulic oil leakage from the transverse hole responsive to the pin is disposed inside the transverse hole; and
         unblock the transverse hole and allow the hydraulic oil to be discharged from the transverse hole responsive to the pin is removed from the transverse hole; and
   a displacement measurement system, the displacement measurement system configured to measure the center of the second flexible diaphragm's displacement,
   wherein responsive to the fluid entering into the sealed chamber:
      the fluid applies the first hydrostatic pressure to the bottom surface of the second flexible diaphragm;
      the top surface of the first flexible diaphragm is displaced upwardly;
      a first amount of the hydraulic oil is displaced from the lower cavity into the upper cavity through the longitudinal hole; and
      the center of the second flexible diaphragm is displaced upwardly due to application of the second hydrostatic pressure to the bottom surface of the second flexible diaphragm.

2. A pressure sensing device, comprising:
   a sealed chamber, comprising:
      an upper portion comprising a first flexible diaphragm, a top surface of the first flexible diaphragm configured to be displaced upwardly responsive to application of a first hydrostatic pressure to a bottom surface of the first flexible diaphragm, an amount of the top surface of the first flexible diaphragm's displacement proportional to a magnitude of the first hydrostatic pressure; and a lower portion, the lower portion comprising an input port, the lower portion configured to receive a fluid at the input port and conduct the fluid toward the first flexible diaphragm;

a second flexible diaphragm, a center of the second flexible diaphragm configured to be displaced upwardly responsive to application of a second hydrostatic pressure to a bottom surface of the second flexible diaphragm, the center of the second flexible diaphragm's displacement proportional to the second hydrostatic pressure; and a protector member disposed onto the top surface of the first flexible diaphragm, the second flexible diaphragm disposed onto the protector member, the protector member comprising:

a bottom surface with a fist concave shape, the bottom surface of the protector member and the top surface of the first flexible diaphragm defining a lower cavity between the protector member and the top surface of the first flexible diaphragm;

a top surface with a second concave shape, the top surface of the protector member and a bottom surface of the second flexible diaphragm defining an upper cavity between the protector member and the second flexible diaphragm; and a longitudinal hole between the lower cavity and the upper cavity, an upper end of the longitudinal hole connected to the upper cavity, a lower end of the longitudinal hole connected to the lower cavity, the lower cavity and the upper cavity in fluid communication with each other through the longitudinal hole, the lower cavity, the upper cavity, and the longitudinal hole filled with a hydraulic oil, wherein responsive to the fluid entering into the sealed chamber:

the fluid applies the first hydrostatic pressure to the bottom surface of the second flexible diaphragm;

the top surface of the first flexible diaphragm is displaced upwardly;

a first amount of the hydraulic oil is displaced from the lower cavity into the upper cavity through the longitudinal hole; and the center of the second flexible diaphragm is displaced upwardly due to application of the second hydrostatic pressure to the bottom surface of the second flexible diaphragm.

3. The pressure sensing device of claim 2, further comprising a displacement measurement system, the displacement measurement system configured to measure the center of the second flexible diaphragm's displacement.

4. The pressure sensing device of claim 3, wherein the first flexible diaphragm has a first disc shape, a thickness of the first flexible diaphragm variable along a surface of the flexible diaphragm, a center of the first flexible diaphragm comprising a first thickness, the thickness of the first flexible diaphragm increasing along a radial direction from the center of the first flexible diaphragm toward a periphery of the first flexible diaphragm.

5. The pressure sensing device of claim 4, wherein:
a center thickness of the center of the first flexible diaphragm is 0.2 millimeter;
a periphery thickness of the periphery of the first flexible diaphragm is 2 millimeters, and
a diameter of the first flexible diaphragm is 50 millimeters.

6. The pressure sensing device of claim 5, wherein:
the second flexible diaphragm has a second disc shape; and
a second flexible diaphragm thickness of the second flexible diaphragm is 0.05 millimeter.

7. The pressure sensing device of claim 6, wherein the hydraulic oil comprises a silicon oil.

8. The pressure sensing device of claim 7, wherein the protector member further comprises:
a transverse hole in fluid communication with the longitudinal hole; and
a pin configured to be disposed inside the transverse hole, a diameter of the pin corresponds to an inner diameter of the transverse hole, the pin configured to:
block the transverse hole and prevent the hydraulic oil leakage from the transverse hole responsive to the pin is disposed inside the transverse hole; and
unblock the transverse hole and allow the hydraulic oil to be discharged from the transverse hole responsive to the pin is removed from the transverse hole.

9. The pressure sensing device of claim 8, wherein a maximum depth of the lower cavity is 0.15 millimeters.

* * * * *